United States Patent
Ren et al.

(10) Patent No.: US 11,505,332 B1
(45) Date of Patent: Nov. 22, 2022

(54) METHOD, SYSTEM, AND DEVICE FOR PREDICTING PARACHUTING TIME IN CASE OF SUDDEN FAILURE

(71) Applicant: Zhuhai Xiangyi Aviation Technology Company LTD., Zhuhai (CN)

(72) Inventors: Lejiang Ren, Zhuhai (CN); Lei Yang, Zhuhai (CN)

(73) Assignee: Zhuhai Xiangyi Aviation Technology Company LTD., Zhuhai (CN)

( * ) Notice: Subject to any disclaimer, the term of this patent is extended or adjusted under 35 U.S.C. 154(b) by 0 days.

(21) Appl. No.: 17/843,962

(22) Filed: Jun. 18, 2022

(30) Foreign Application Priority Data

May 19, 2022 (CN) .......................... 202210541304.3

(51) Int. Cl.
  *B64D 45/00* (2006.01)
  *G06V 20/17* (2022.01)
  *G08G 5/00* (2006.01)
  *G06N 3/02* (2006.01)

(52) U.S. Cl.
  CPC ............. *B64D 45/00* (2013.01); *G06V 20/17* (2022.01); *G08G 5/003* (2013.01); *B64D 2045/0085* (2013.01); *G06N 3/02* (2013.01)

(58) Field of Classification Search
  CPC ....... G06F 16/215; G06F 16/29; G06N 20/10; G06N 3/04; G06Q 10/04
  See application file for complete search history.

(56) References Cited

U.S. PATENT DOCUMENTS

2017/0354887 A1* 12/2017 Bollermann .......... A63F 13/803
2020/0168104 A1*  5/2020 Holder .................... B64D 45/00

FOREIGN PATENT DOCUMENTS

GB        2522926 A  *  8/2015  ......... G05B 23/0262

* cited by examiner

*Primary Examiner* — Shon G Foley
(74) *Attorney, Agent, or Firm* — Bayramoglu Law Offices LLC (57) ABSTRACT

A method, system, and device for predicting parachuting time in case of a sudden failure are provided to resolve a prior art problem that parachuting time of a parachutist in case of a sudden failure of an aircraft cannot be predicted accurately and efficiently. The method includes: obtaining input data; preprocessing the input data; determining whether an aircraft is in a sudden failure state; generating a movement track and a landing point range of parachuting; calculating a movement track and a falling point range of the aircraft after a parachutist performs parachuting, and impact force and a damage range after the aircraft falls; and obtaining a prediction result of parachuting time of the parachutist by a pre-constructed parachuting time prediction model. The method, system, and device can accurately and efficiently predict the parachuting time of the parachutist in case of the sudden failure of the aircraft.

18 Claims, 3 Drawing Sheets

METHOD, SYSTEM, AND DEVICE FOR PREDICTING PARACHUTING TIME IN CASE OF SUDDEN FAILURE

CROSS REFERENCE TO THE RELATED APPLICATIONS

This application is based upon and claims priority to Chinese Patent Application No. 202210541304.3, filed on May 19, 2022, the entire contents of which are incorporated herein by reference.

TECHNICAL FIELD

The present disclosure relates to the technical field of machine learning and data prediction, and specifically, to a method, system, and device for predicting parachuting time in case of a sudden failure.

BACKGROUND

Parachuting is an activity characterized by high levels of complexity, dangerousness, and intensity, is fast-paced, and has great communication difficulty. Parachuting imposes a high requirement on the physical attributes of the parachutist and is greatly affected by weather conditions. After a parachutist leaves an aircraft, weather conditions make it more difficult for the parachutist to determine the position of a landing point, resulting in deviation from the target landing point. At night, parachuting difficulty increases greatly due to darkness and a reduced field of vision. Therefore, it is of great significance to choose the right time for parachuting to ensure safety of the parachutist and prevent property of residents from damage, especially if the aircraft (such as a small aircraft, a trainer aircraft, or a fighter aircraft) suddenly failing. In view of this, the present disclosure provides a method for predicting parachuting time in case of a sudden failure.

SUMMARY

To resolve the above problems in the prior art, namely, to resolve the prior art problem that parachuting time of a parachutist in case of a sudden failure of an aircraft cannot be predicted accurately and efficiently, a first aspect of the present disclosure provides a method for predicting parachuting time in case of a sudden failure. The method may include:

In step S100, three-dimensional (3D) environment data, sensor data, received tower data, and geographic information system (GIS) map data within a currently specified position range when an aircraft flies in a specified flight course may be obtained and may be taken as input data. The 3D environment data may include weather conditions, air temperature, air pressure, and wind force at different altitudes.

In step S200, the input data may be pre-processed to obtain preprocessed input data. The preprocessed input data may include preprocessed 3D environment data, preprocessed sensor data, preprocessed tower data, and preprocessed GIS map data within the currently specified position range.

In step S300, based on the preprocessed sensor data, whether the aircraft is in a sudden failure state may be determined. If the aircraft is in the sudden failure state, step S400 may be performed. If the aircraft is not in the sudden failure state, step S100 may be performed.

In step S400, weight data of a parachutist may be obtained. Based on the preprocessed 3D environment data and the preprocessed GIS map data within the currently specified position range, a movement track of parachuting and a landing point range of parachuting may be generated.

In step S500, based on the preprocessed 3D environment data, the preprocessed sensor data, and the preprocessed GIS map data within the currently specified position range, a movement track and a falling point range of the aircraft after the parachutist performs parachuting and impact force and a damage range after the aircraft falls may be calculated.

In step S600, based on the movement track of parachuting and the movement track of the aircraft after the parachutist performs parachuting, a minimum horizontal distance, maximum horizontal distance, minimum vertical distance, and maximum vertical distance between the parachutist and the aircraft at a same time point after parachuting may be calculated. A prediction result of parachuting time of the parachutist may be obtained by a pre-constructed parachuting time prediction model based on the landing point range of parachuting, the falling point range of the aircraft, the impact force and the damage range after the aircraft falls, and the preprocessed tower data.

In some preferred implementations, the preprocessing may include removal of a data outlier and data standardization.

In some preferred implementations, the parachuting time prediction model is constructed based on a convolution neural network (CNN), a long short-term memory (LSTM) artificial neural network, a feature processing module, and a machine learning model.

The CNN and the LSTM artificial neural network are configured to extract a feature of input data in a specified time period in parallel. The feature extracted by the CNN is taken as a first feature, and the feature extracted by the LSTM artificial neural network is taken as a second feature.

The feature processing module is configured to fuse the extracted first feature and second feature, take a fused feature as a third feature, perform residual connection and layer normalization on the third feature and the first feature, and take a processed feature as a fourth feature.

The machine learning model is a support vector machine (SVM) regression model and is configured to obtain the prediction result of the parachuting time of the parachutist after performing a support vector regression operation on the fourth feature.

In some preferred implementations, a length of a convolution kernel of the CNN is consistent with a size of a time step in the LSTM artificial neural network.

A second aspect of the present disclosure provides a system for predicting parachuting time in case of a sudden failure, including a data obtaining module, a preprocessing module, a failure state determining module, a parachuting data calculation module, an aircraft data calculation module, and a time prediction module.

The data obtaining module is configured to obtain 3D environment data, sensor data, received tower data, and GIS map data within a currently specified position range when an aircraft flies in a specified flight course and take as input data. The 3D environment data includes weather conditions, air temperature, air pressure, and wind force at different altitudes.

The preprocessing module is configured to preprocess the input data to obtain preprocessed input data. The preprocessed input data includes preprocessed 3D environment data, preprocessed sensor data, preprocessed tower data, and preprocessed GIS map data within the currently specified position range.

The failure state determining module is configured to determine, based on the preprocessed sensor data, whether the aircraft is in a sudden failure state. The parachuting data calculation module is executed if the aircraft is in the sudden failure state. The data obtaining module is executed if the aircraft is not in the sudden failure state.

The parachuting data calculation module is configured to obtain weight data of a parachutist, and generate, based on the preprocessed 3D environment data and the preprocessed GIS map data within the currently specified position range, a movement track of parachuting and a landing point range of parachuting.

The aircraft data calculation module is configured to calculate, based on the preprocessed 3D environment data, the preprocessed sensor data, and the preprocessed GIS map data within the currently specified position range, a movement track and a falling point range of the aircraft after the parachutist performs parachuting, as well as impact force and a damage range after the aircraft falls.

The time prediction module is configured to calculate, based on the movement track of parachuting and the movement track of the aircraft after the parachutist performs parachuting, a minimum horizontal distance, maximum horizontal distance, minimum vertical distance, and maximum vertical distance between the parachutist and the aircraft at a same time point after parachuting, and obtain a prediction result of parachuting time of the parachutist by a pre-constructed parachuting time prediction model based on the landing point range of parachuting, the falling point range of the aircraft, the impact force and the damage range after the aircraft falls, and the preprocessed tower data.

A third aspect of the present disclosure provides an electronic device that includes at least one processor and a memory communicatively connected to the at least one processor. The memory stores an instruction executable by the processor; the instruction is configured to be executed by the processor to implement the above method for predicting parachuting time in case of a sudden failure.

A fourth aspect of the present disclosure provides a computer-readable storage medium. The computer-readable storage medium stores a computer instruction, and the computer instruction is configured to be executed by a computer to implement the above method for predicting parachuting time in case of a sudden failure.

The present disclosure has the following beneficial effects:

The present disclosure can accurately and efficiently predict parachuting time of a parachutist in case of a sudden failure of an aircraft.

(1) In an emergency situation of the aircraft, the present disclosure calculates a movement track and a landing point range of a parachutist during parachuting, calculates a movement track and a falling point range of the aircraft after the parachutist performs parachuting, as well as impact force and a damage range after the aircraft falls, and finally a prediction result of parachuting time of the parachutist is obtained by the pre-constructed parachuting time prediction model based on the landing point range of parachuting, the falling point range of the aircraft, and the impact force and the damage range after the aircraft falls. This improves prediction accuracy of the parachuting time and safety of the parachutist.

(2) The CNN and the LSTM network are combined in a parallel structure, and the data features extracted by the CNN and the LSTM network are spliced for prediction, which not only improves the prediction accuracy, but also reduces network complexity.

BRIEF DESCRIPTION OF THE DRAWINGS

Other features, objectives, and advantages of the present disclosure will become more apparent upon reading the detailed description of the non-restrictive embodiments made below with reference to the accompanying drawings.

DETAILED DESCRIPTION OF THE EMBODIMENTS

In order to make the objectives, technical solutions, and advantages of the present disclosure clearer, the technical solutions in the embodiments of the present disclosure are described clearly and completely below with reference to the accompanying drawings. Apparently, the described embodiments are some rather than all the embodiments.

Steps in an embodiment of the method in the present disclosure are described in detail below with reference to FIG. 1 to FIG. 4. As shown FIG. 1, the method for predicting parachuting time in case of a sudden failure according to this embodiment of the present disclosure includes steps S100 to S600.

Figure 1:
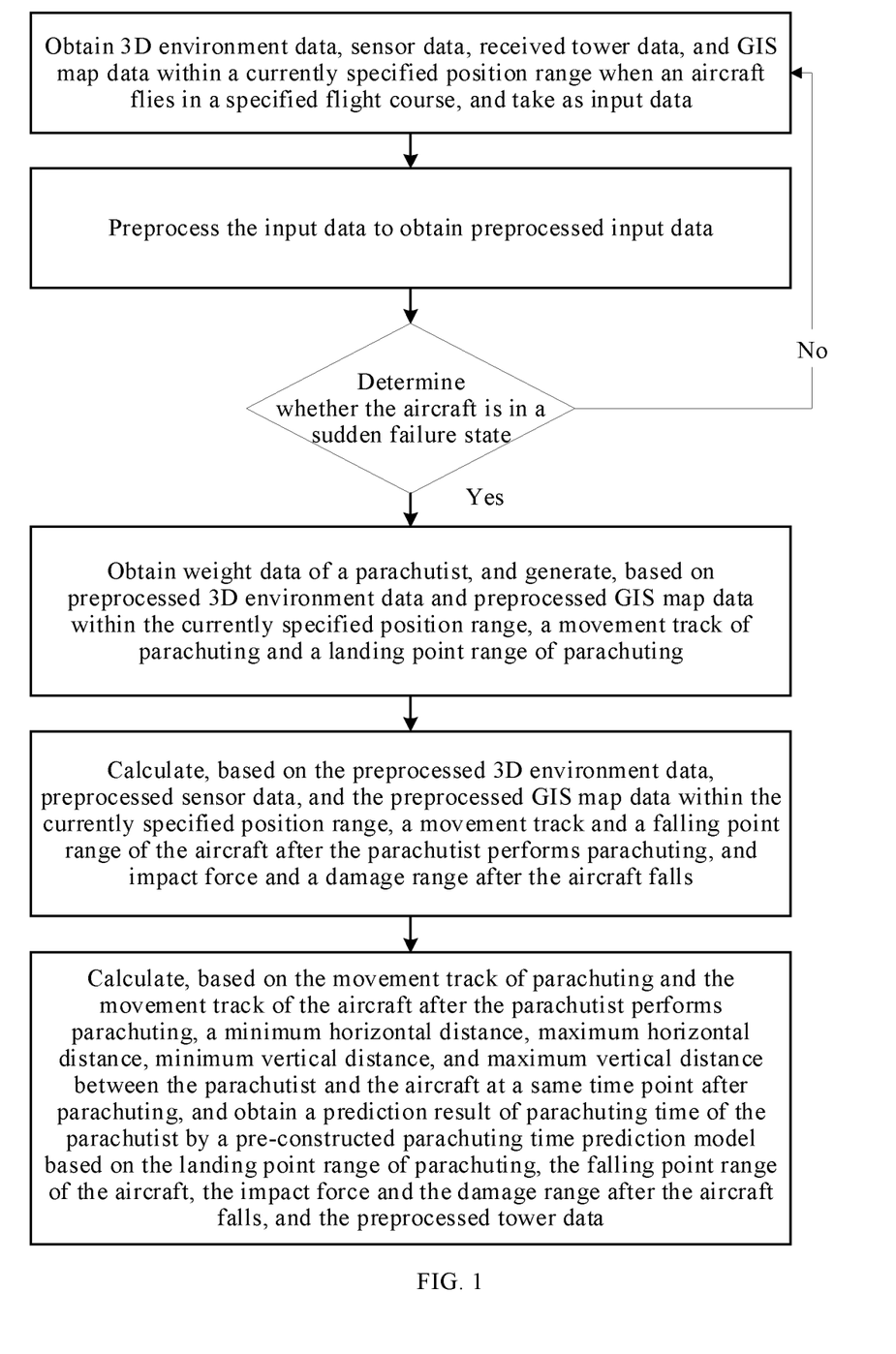
FIG. 1 is a schematic flowchart of a method for predicting parachuting time in case of a sudden failure according to an embodiment of the present disclosure.

In step S100, 3D environment data, sensor data, received tower data, and GIS map data within a currently specified position range when an aircraft flies in a specified flight course are obtained and are taken as input data. The 3D environment data includes weather conditions, air temperature, air pressure, and wind force at different altitudes.

In this embodiment, the 3D environment data, the sensor data, the received tower data, and the GIS map data within the currently specified position range when the aircraft flies in the specified flight course are obtained.

The 3D environment data includes the weather conditions, the air temperature, the air pressure, and the wind force at the different altitudes. The sensor data includes a pitch angle, a yaw angle, a roll angle, a speed, cumulative change values of a rudder deflection angle of an aileron, a rudder deflection angle of an elevator, and a throttle action within a fixed quantity of time steps, as well as sensor monitoring parameters of other devices. The received tower data includes meteorological data and flight instructions for the aircraft. The GIS map data within the currently specified position range includes a geomorphic condition of the earth's surface, such as a town, a village, a grassland, a forest, or a mountain.

In step S200, the input data is preprocessed to obtain preprocessed input data. The preprocessed input data includes preprocessed 3D environment data, preprocessed sensor data, preprocessed tower data, and preprocessed GIS map data within the currently specified position range.

In this embodiment, the input data is preprocessed. The preprocessing includes removal of a data outlier and data standardization. In other embodiments, a data preprocessing method can be selected based on actual needs.

In step S300, based on the preprocessed sensor data, whether the aircraft is in a sudden failure state is determined. If the aircraft is in the sudden failure state, step S400 is performed. If the aircraft is not in the sudden failure state, step S100 is performed.

In this embodiment, after the input data is preprocessed, whether the aircraft is in the sudden failure state is determined based on the preprocessed sensor data. If the aircraft is in the sudden failure state, parachuting time is predicted directly. If the aircraft is in a normal state, the input data is continuously collected.

In the present disclosure, whether the aircraft is in the sudden failure state is determined by using a failure critical point analysis model. The failure critical point analysis model is constructed based on a 1D U-Net network and trained to determine whether the aircraft is in the failure state.

When being connected across levels, features that have a same scale and are of an encoder and a decoder in the improved 1D U-Net network are spliced after convolution and residual connection. A specific method is as follows:

A feature encoded by an encoding module in the encoder is processed by N successively connected residual convolution modules and then spliced with a feature with a same scale as the encoded feature in the decoder to serve as an input of a corresponding decoding module in the decoder.

The residual convolution module includes a 3×1 convolution layer and a 1×1 residual layer. The residual convolution module is configured to perform convolution and residual processing on the input feature and add up processed input features.

In step S400, weight data of a parachutist is obtained. Based on the preprocessed 3D environment data and the preprocessed GIS map data within the currently specified position range, a movement track of parachuting and a landing point range of parachuting are generated.

In this embodiment, the weight data of the parachutist is obtained, the movement track of the parachutist during parachuting is generated by using a flight dynamics method or an aerodynamics method based on the preprocessed 3D environment data. The landing point range of parachuting is obtained based on a current position of the parachutist and the GIS map data within the currently specified position range. The flight dynamics method or the aerodynamics method belongs to the prior art and is not described herein.

In step S500, based on the preprocessed 3D environment data, the preprocessed sensor data, and the preprocessed GIS map data within the currently specified position range, a movement track and a falling point range of the aircraft after the parachutist performs parachuting, as well as impact force and a damage range after the aircraft falls are calculated.

In this embodiment, the calculating a movement track and a falling point range of the aircraft after the parachutist performs parachuting, as well as impact force and a damage range after the aircraft falls includes:

obtaining a failure type of the aircraft on which a sudden failure occurs (namely, a specific failure position of the aircraft), analyzing all parameters and flight dynamics characteristics of the aircraft based on the failure type, and performing remodeling to obtain a new nonlinear model in case of the sudden failure of the aircraft.

The new nonlinear model in case of the sudden failure of the aircraft includes a nonlinear dynamics model for an engine failure, a nonlinear dynamics model for a hydraulic failure, a nonlinear dynamics model for a fuel tank failure, and a nonlinear dynamics model for metal fatigue. The nonlinear dynamics model for the engine failure, the nonlinear dynamics model for the hydraulic failure, the nonlinear dynamics model for the fuel tank failure, and the nonlinear dynamics model for the metal fatigue all adopt the prior art and are not described herein.

The nonlinear dynamics model for the engine failure is:

$$\ddot{\phi} = \frac{\omega_\phi^2}{2\zeta_\phi \omega_\phi} \left( \frac{(M-N)\dot{\theta}\dot{\psi}}{L} + \frac{K_u}{L} - \frac{K_1 \dot{\phi}}{L} \right) \quad (1)$$

$$\ddot{\theta} = \frac{(N-L)\dot{\phi}\dot{\psi}}{M} + \frac{K_u(u_1 - u_2)}{M} - \frac{K_2 \dot{\theta}}{M} \quad (2)$$

$$\ddot{\psi} = \frac{(L-M)\dot{\phi}\dot{\theta}}{N} + \frac{(u_1 + u_2)}{N} - \frac{K_3 \dot{\psi}}{N} \quad (3)$$

where $\phi$ represents the roll angle; $\theta$ represents the pitch angle; $\psi$ represents the yaw angle; L, M, and N represent moments of inertia around three axial directions of a coordinate system of an aircraft body; $\omega_\phi$ and $\zeta_\phi$ represent a frequency and a damping, respectively; $K_u$ represents an aerodynamic gain; $u_i$ represents a pulse width signal value output to a motor of the aircraft (a new electric aircraft engine is preferred in the present disclosure so it is necessary to obtain the pulse width signal value); i represents a subscript, namely, an $i^{th}$ aircraft engine; $K_i$ represents a drag coefficient of the aircraft in a flight process; $\dot{\phi}$, $\dot{\theta}$, and $\dot{\psi}$ represent first-order derivatives of $\phi$, $\theta$, and $\psi$, respectively; and $\ddot{\phi}$, $\ddot{\theta}$ and $\ddot{\psi}$ represent second-order derivatives of $\phi$, $\theta$, and $\psi$, respectively.

In addition, since the present disclosure is aimed at a small aircraft, a trainer aircraft, a fighter aircraft, and other aircrafts, a parachuting mode is preferably ejection by an ejection seat thruster. When the ejection seat thruster completes ejection, thrust has a great impact on a flight trajectory of the aircraft. Therefore, in the following embodiments, the pitch angle of the aircraft when the parachutist completes ejection by the ejection seat thruster is calculated first, and then the movement track of the aircraft after the parachutist performs parachuting is obtained by using the nonlinear dynamics model based on the preprocessed 3D environment data and sensor data.

In the present disclosure, when the pitch angle of the aircraft is calculated, it is assumed that the aircraft is in a horizontal flight state. Therefore, the pitch angle of the aircraft when the parachutist completes ejection by the ejection seat thruster is obtained as follows:

$$F_y = -F\sin(\alpha + \beta)\sin b + F\cos(\alpha + \beta)\cos\gamma\cos b \quad (4)$$

$$a = \frac{F_y}{m} \quad (5)$$

$$\tan\theta_{change} = \frac{mat}{v_1} \quad (6)$$

$$\theta_{after} = \theta_{before} - \theta_{change} \quad (7)$$

where $\theta_{before}$ and $\theta_{after}$ respectively represent pitch angles of the aircraft before and after the parachutist completes ejection by the ejection seat thruster, $\theta_{change}$ represents a change of the pitch angle of the aircraft after ejection of the ejection seat thruster, $\alpha$ represents an acceleration in a vertical direction, t represents ejection time of the ejection seat thruster, m represents mass of the aircraft, $v_1$ represents a speed of the aircraft in a horizontal direction, $F_y$ represents a component of thrust F of the ejection seat thruster on a y axis, $\beta$ represents an installation corner of the ejection seat thruster, $\gamma$ represents a roll angle of the ejection seat thruster, $\alpha$ represents an angle of attack of the ejection seat thruster, and b represents an inclination angle of the ejection seat thruster.

The falling point range is calculated based on the movement track of the aircraft and the GIS map data within the currently specified position range.

Finally, a corresponding geomorphic condition (specifically including ground buildings and people, and hardness of an object that the aircraft may collide with when falling) within the falling point range is obtained based on the GIS map data and the falling point range to further calculate the impact force and the damage range after the aircraft falls.

In step S600, based on the movement track of parachuting and the movement track of the aircraft after the parachutist performs parachuting, a minimum horizontal distance, maximum horizontal distance, minimum vertical distance, and maximum vertical distance between the parachutist and the aircraft at a same time point after parachuting are calculated. A prediction result of parachuting time of the parachutist is obtained by a pre-constructed parachuting time prediction model based on the landing point range of parachuting, the falling point range of the aircraft, the impact force and the damage range after the aircraft falls, and the preprocessed tower data.

Figure 4:
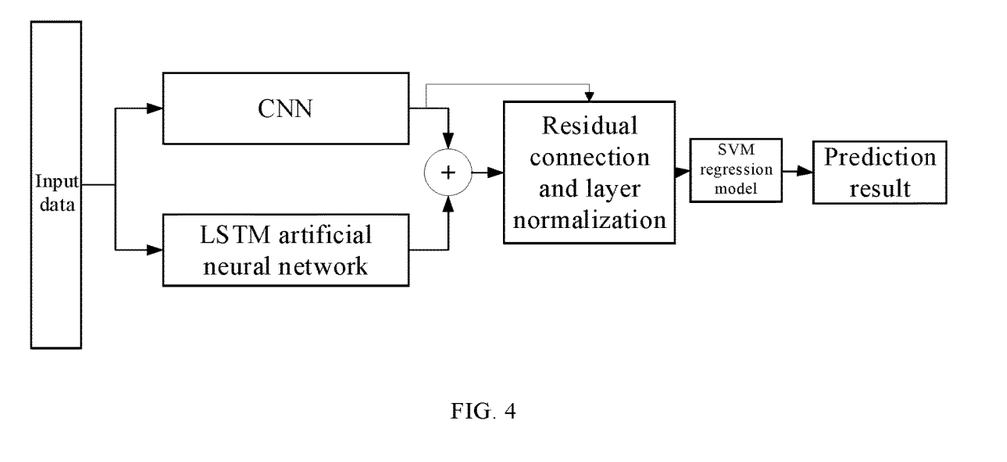
FIG. 4. Is a schematic frame diagram of a structure of a parachuting time prediction model according to an embodiment of the present disclosure.

In this embodiment, the parachuting time prediction model is constructed based on a CNN, an LSTM artificial neural network, a feature processing module, and a machine learning model, as shown in FIG. 4.

The CNN and the LSTM artificial neural network (a length of a convolution kernel of the CNN is consistent with a size of a time step in the LSTM artificial neural network) are configured to extract a feature of input data in a specified time period in parallel. The feature extracted by the CNN is taken as a first feature, and the feature extracted by the LSTM artificial neural network is taken as a second feature.

The feature processing module is configured to fuse the extracted first feature and second feature, take a fused feature as a third feature, perform residual connection and layer normalization on the third feature and the first feature, and take a processed feature as a fourth feature.

The machine learning model is an SVM regression model and is configured to obtain the prediction result of the parachuting time of the parachutist after performing a support vector regression operation on the fourth feature.

The SVM regression model takes a hybrid L 1/L2 norm function as a loss function and a Laplace function as a kernel function during training and selects a regularization parameter in the loss function and a kernel width parameter in the Laplace function by a heuristic random search algorithm. The loss function is specifically as follows:

$$\text{LOSS} = cd\|x\|_1 + \|y - \hat{y}\|_1 + \frac{c(1-d)}{2}\|x\|_2^2 + \lambda\|y - \hat{y}\|_2^2 \qquad (8)$$

where LOSS represents the loss function, c and d represent regularization parameters, x represents an input of the SVM regression model, y and $\hat{y}$ represent the prediction result and a truth-value label (real parachuting time of the parachutist) of the parachuting time of the parachutist, respectively, and $\lambda$ represents a preset weight parameter.

Figure 3:
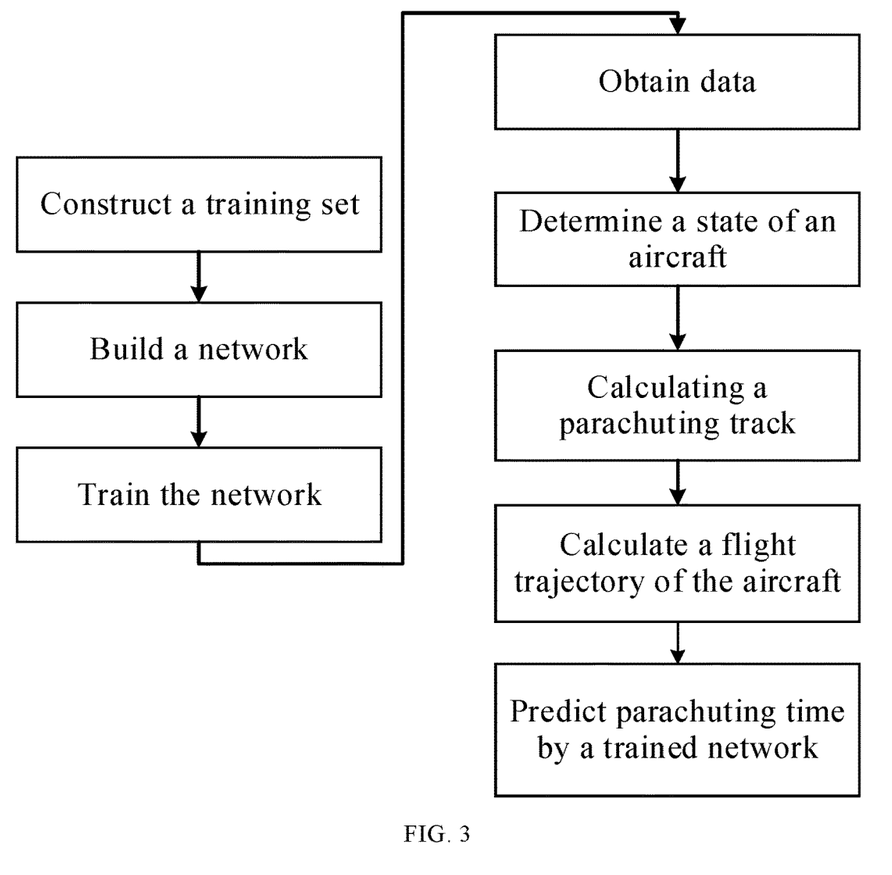
FIG. 3 is a schematic diagram of a training process and an application process of a parachuting time prediction model according to an embodiment of the present disclosure.

Model training is performed based on the above constructed parachuting time prediction model and the loss function. After the model training, the prediction result of the parachuting time of the parachutist is obtained by using a trained model, as shown in FIG. 3.

In addition, the method for predicting parachuting time in case of a sudden failure in the present disclosure can also be applied to simulated training of parachuting. For example, in a full-motion flight simulator, the parachutist selects appropriate parachuting time based on a simulated parachuting environment, and then the method in the present disclosure calculates accurate parachuting time and feeds it back to the parachutist to carry out simulated training and teaching of parachuting.

Figure 2:
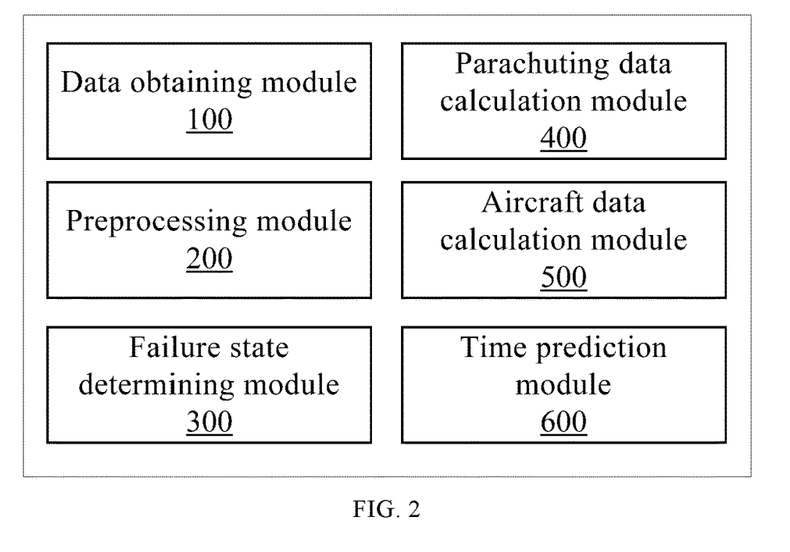
FIG. 2 is a schematic frame diagram of a system for predicting parachuting time in case of a sudden failure according to an embodiment of the present disclosure.

A second embodiment of the present disclosure provides a system for predicting parachuting time in case of a sudden failure, including a data obtaining module 100, a preprocessing module 200, a failure state determining module 300, a parachuting data calculation module 400, an aircraft data calculation module 500, and a time prediction module 600, as shown in FIG. 2.

The data obtaining module 100 is configured to obtain 3D environment data, sensor data, received tower data, and GIS map data within a currently specified position range when an aircraft flies in a specified flight course and take as input data. The 3D environment data includes weather conditions, air temperature, air pressure, and wind force at different altitudes.

The preprocessing module 200 is configured to preprocess the input data to obtain preprocessed input data. The preprocessed input data includes preprocessed 3D environment data, preprocessed sensor data, preprocessed tower data, and preprocessed GIS map data within the currently specified position range.

The failure state determining module 300 is configured to determine, based on the preprocessed sensor data, whether the aircraft is in a sudden failure state. The parachuting data calculation module 400 is executed if the aircraft is in the sudden failure state. The data obtaining module 100 is executed if the aircraft is not in the sudden failure state.

The parachuting data calculation module 400 is configured to obtain weight data of a parachutist, and generate, based on the preprocessed 3D environment data and the preprocessed GIS map data within the currently specified position range, a movement track of parachuting and a landing point range of parachuting.

The aircraft data calculation module 500 is configured to calculate, based on the preprocessed 3D environment data, the preprocessed sensor data, and the preprocessed GIS map data within the currently specified position range, a movement track and a falling point range of the aircraft after the parachutist performs parachuting, as well as impact force and a damage range after the aircraft falls.

The time prediction module 600 is configured to calculate, based on the movement track of parachuting and the movement track of the aircraft after the parachutist performs parachuting, a minimum horizontal distance, maximum horizontal distance, minimum vertical distance, and maximum vertical distance between the parachutist and the aircraft at a same time point after parachuting, and obtain a prediction result of parachuting time of the parachutist by a pre-constructed parachuting time prediction model based on the landing point range of parachuting, the falling point range of the aircraft, the impact force and the damage range after the aircraft falls, and the preprocessed tower data.

It should be noted that the system for predicting parachuting time in case of a sudden failure provided in the above embodiments is only described by taking the division of the above functional modules as an example. In practical applications, the above functions can be completed by different functional modules as required, that is, the modules or steps in the embodiments of the present disclosure are further decomposed or combined. For example, the modules of the above embodiments may be combined into one module, or may be further divided into a plurality of sub-modules to complete all or part of the functions described above. The names of the modules and steps involved in the embodiments of the present disclosure are only for distinguishing each module or step and should not be regarded as improper limitations on the present disclosure.

An electronic device according to a third embodiment of the present disclosure includes: at least one processor and a memory communicatively connected to the at least one processor. The memory stores an instruction executable by the processor, and the instruction is configured to be executed by the processor to implement the above method for predicting parachuting time in case of a sudden failure.

A computer-readable storage medium according to a fourth embodiment of the present disclosure stores a computer instruction, and the computer instruction is configured to be executed by a computer to implement the above method for predicting parachuting time in case of a sudden failure.

Those skilled in the art can clearly understand that, for convenience and brevity of the description, reference can be made to a corresponding process in the foregoing method embodiment for specific working processes and related descriptions of the above-described storage apparatus and processing apparatus. Details are not described herein again.

Figure 5:
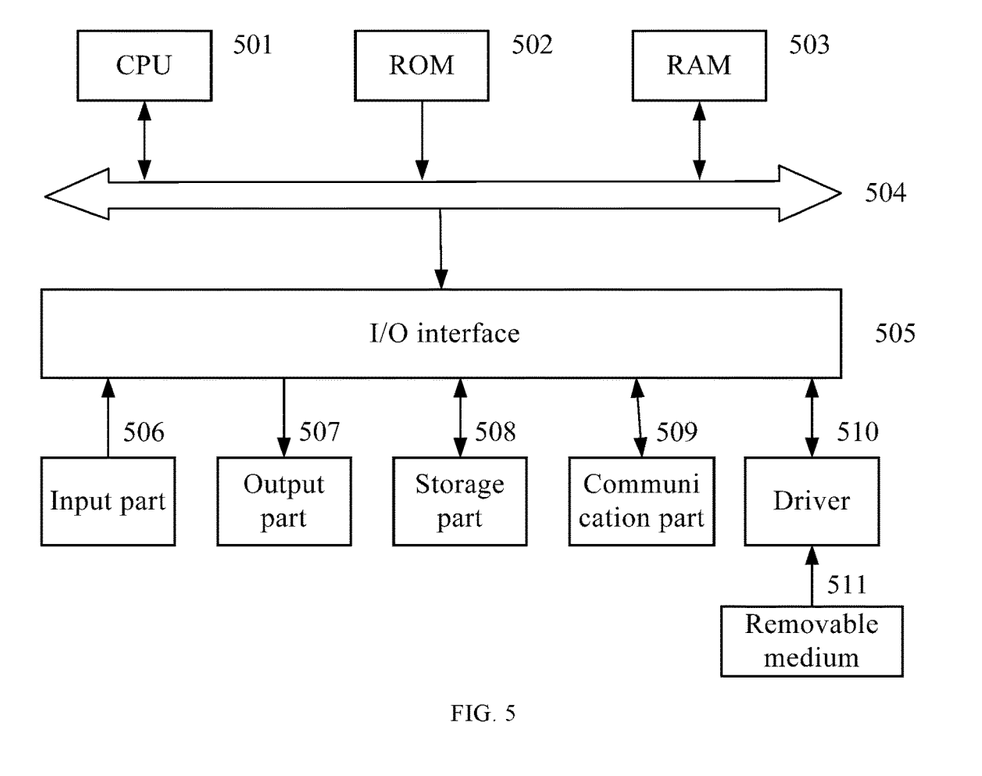
FIG. 5 is a schematic structural diagram of a computer system of an electronic device suitable for implementing embodiments of the present disclosure according to an embodiment of the present disclosure.

FIG. 5 is a schematic structural diagram of a computer system of a server suitable for implementing the method, system and device embodiments of the present disclosure. The server shown in FIG. 5 is merely an example and should not be conceived as any limitation to the functions and application range of the embodiments of the present disclosure.

As shown in FIG. 5, the computer system includes a central processing unit (CPU) 501, which can perform various suitable actions and processing according to a program stored in a read-only memory (ROM) 502 or a program loaded from a storage part 508 to a random access memory (RAM) 503. The RAM 503 further stores various programs and data required for operations of the system. The CPU 501, the ROM 502, and the RAM 503 are connected to each other through a bus 504. An input/output (I/O) interface 505 is also connected to the bus 504.

The following components are connected to the I/O interface 505: an input part 506 including a keyboard and a mouse; an output part 507 including a cathode-ray tube (CRT), a liquid crystal display (LCD) and a loudspeaker; the storage part 508 including a hard disk; and a communication part 509 including a network interface card such as a local area network (LAN) card or a modem. The communication part 509 executes communication processing via a network such as the Internet. A driver 510 may also be connected to the I/O interface 505 as required. A removable medium 511, such as a magnetic disk, an optical disc, a magneto-optical disc, or a semiconductor memory, is installed on the driver 510 as required, such that a computer program read therefrom can be installed in the storage part 508 as required.

Particularly, according to the embodiments of the present disclosure, the process described above with reference to the flowchart may be implemented as a computer software program. For example, an embodiment of the present disclosure includes a computer program product including a computer program carried by a computer-readable medium. The computer program includes program code for executing the method shown in the flowchart. In this embodiment, the computer program may be downloaded from a network by means of the communication part and installed and/or be installed from the removable medium. When the computer program is executed by the CPU, the functions defined in the method of the present disclosure are executed. It should be noted that, the computer-readable medium in the present disclosure may be a computer-readable signal medium, a computer-readable storage medium, or a combination thereof. The computer-readable storage medium may be, for example, but not limited to, electrical, magnetic, optical, electromagnetic, infrared, or semiconductor systems, apparatuses, or devices, or any combination thereof. More specific examples of the computer-readable storage medium may include, but are not limited to: an electric connector with one or more wires, a portable computer magnetic disk, a hard disk, a RAM, a ROM, an erasable programmable read-only memory (EPROM or flash memory), an optical fiber, a portable compact disk read-only memory (CD-ROM), an optical storage device, a magnetic storage device, or any proper combination thereof. In the present disclosure, the computer-readable storage medium may be any tangible medium including or storing a program, and the program may be used by or used in combination with an instruction execution system, apparatus, or device. In the present disclosure, the computer-readable signal medium may include a data signal propagated in a baseband or propagated as a part of a carrier, and carries computer-readable program code. The propagated data signal may be in various forms, including but not limited to an electromagnetic signal, an optical signal, or any suitable combination thereof. The computer-readable signal medium may alternatively be any computer-readable medium except the computer-readable storage medium. The computer-readable medium may send, propagate, or transmit a program used by or used in combination with an instruction execution system, apparatus or device. The program code contained on the computer-readable medium may be transmitted using any suitable medium, including but not limited to: wireless, wire, optical fiber, RF, or any suitable combination thereof.

The computer program code for executing the operations in the present disclosure may be compiled by using one or more program design languages or a combination thereof. The programming languages include object oriented programming languages, such as Java, Smalltalk, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. When a remote computer is involved, the remote computer may be connected to the user computer via any type of network including a LAN or a wide area network (WAN), or may be connected to an external computer (for example, connected via the Internet by using an Internet service provider).

The flowcharts and block diagrams in the accompanying drawings illustrate system architectures, functions, and operations that may be implemented by the system, method and computer program product according to the embodiments of the present disclosure. In this regard, each block in the flowcharts or block diagrams may represent a module, a program segment, or a part of code, and the module, the program segment or the part of code includes one or more executable instructions for implementing specified logic functions. It should also be noted that, in some alternative implementations, the functions marked in the blocks may alternatively be performed in an order different from that marked in the drawings. For example, two successively shown blocks actually may be executed in parallel substantially, or may be executed in reverse order sometimes, depending on the functions involved. It should also be noted that each block in the block diagrams and/or flowcharts and combinations of the blocks in the block diagrams and/or flowcharts may be implemented by a dedicated hardware-based system for executing specified functions or operations, or may be implemented by a combination of dedicated hardware and computer instructions.

Terms such as "first" and "second" are intended to distinguish between similar objects, rather than describe or indicate a specific order or sequence.

Terms "include", "comprise" or any other variations thereof are intended to cover non-exclusive inclusions, such that a process, a method, an article, or a device/apparatus including a series of elements not only includes those elements, but also includes other elements that are not explicitly listed, or also includes inherent elements of the process, the method, the article, or the device/apparatus.

The technical solutions of the present disclosure are described with reference to the preferred implementations shown in the accompanying drawings. Those skilled in the art should easily understand that the protection scope of the present disclosure is apparently not limited to these specific implementations. Those skilled in the art can make equivalent changes or substitutions to the relevant technical features without departing from the principles of the present disclosure, and the technical solutions after these changes or substitutions should fall within the protection scope of the present disclosure.

What is claimed is:

1. A method for predicting a parachuting time, which is a time at which parachuting is initiated, in case of a sudden failure, comprising the following steps:

step S100: obtaining three-dimensional (3D) environment data, sensor data, received tower data, and geographic information system (GIS) map data within a current position range about a location of an aircraft when the aircraft flies in a flight course, and taking the 3D environment data, the sensor data, the received tower data, and the GIS map data within the current position range as input data, wherein the 3D environment data comprises weather conditions, air temperature, air pressure, and wind force at different altitudes;

step S200: preprocessing the input data to obtain preprocessed input data, wherein the preprocessed input data comprises preprocessed 3D environment data, preprocessed sensor data, preprocessed tower data, and preprocessed GIS map data within the current position range;

step S300: determining, based on the preprocessed sensor data, whether the aircraft is in a sudden failure state; and performing step S400 if the aircraft is in the sudden failure state, or performing step S100 if the aircraft is not in the sudden failure state;

step S400: obtaining weight data of a parachutist, and generating, based on the preprocessed 3D environment data and the preprocessed GIS map data within the current position range, a trajectory of parachuting and a range of landing points of the parachuting;

step S500: calculating, based on the preprocessed 3D environment data, the preprocessed sensor data, and the preprocessed GIS map data within the current position range, a trajectory of the aircraft and a range of collision points of the aircraft after the parachutist performs the parachuting, and an impact force of the aircraft from a collision and a damage range of the aircraft from the collision; and step S600: calculating, based on the trajectory of the parachuting and the trajectory of the aircraft after the parachutist performs the parachuting, a minimum horizontal distance between the parachutist and the aircraft at a same time point after the parachuting, a maximum horizontal distance between the parachutist and the aircraft at the same time point after the parachuting, a minimum vertical distance between the parachutist and the aircraft at the same time point after the parachuting, and a maximum vertical distance between the parachutist and the aircraft at the same time point after the parachuting, and obtaining a prediction result of the parachuting time of the parachutist by a pre-constructed parachuting time prediction model based on the range of landing points of the parachuting, the range of collision points of the aircraft, the impact force of the aircraft and the damage range of the aircraft from the collision, and the preprocessed tower data, wherein the pre-constructed parachuting time prediction model is constructed based on a convolution neural network (CNN), a long short-term memory (LSTM) artificial neural network, a feature processing module that is implemented by at least one hardware processor, and a machine learning model;

the CNN and the LSTM artificial neural network are configured to extract a feature of the input data in a specified time period in parallel, wherein the feature extracted by the CNN is taken as a first feature, and the feature extracted by the LSTM artificial neural network is taken as a second feature;

the processor, in implementing the feature processing module, is configured to fuse the first feature and the second feature to obtain a fused feature, the processor, in implementing the feature processing module, is configured to take the fused feature as a third feature, the processor, in implementing the feature processing module, is configured to perform a residual connection and a layer normalization on the third feature and the first feature to obtain a processed feature, and the processor, in implementing the feature processing module, is configured to take the processed feature as a fourth feature; and the machine learning model is configured to obtain the prediction result of the parachuting time of the parachutist after performing a support vector regression operation on the fourth feature, wherein the machine learning model is a support vector machine (SVM) regression model.

2. The method according to claim 1, wherein the step of preprocessing the input data comprises a removal of a data outlier and a data standardization.

3. The method according to claim 1, wherein the step of calculating the trajectory of the aircraft and the range of collision points of the aircraft after the parachutist performs the parachuting, and the impact force of the aircraft and the damage range of the aircraft from the collision comprises:
- obtaining a failure type of the aircraft based on the preprocessed sensor data;
- analyzing parameters of the aircraft and flight dynamics characteristics of the aircraft based on the failure type of the aircraft and performing a remodeling to obtain a new nonlinear model in case of the sudden failure of the aircraft;
- obtaining, by the new nonlinear model based on the preprocessed 3D environment data and the preprocessed sensor data, the trajectory of the aircraft after the parachutist performs the parachuting, and obtaining the range of collision points based on the preprocessed GIS map data within the current position range; and
- obtaining a geomorphic condition within the range of collision points based on the preprocessed GIS map data within the current position range and the range of collision points and calculating the impact force of the aircraft and the damage range of the aircraft from the collision.

4. The method according to claim 3, wherein the new nonlinear model in case of the sudden failure of the aircraft comprises a nonlinear dynamics model for an engine failure, a nonlinear dynamics model for a hydraulic failure, a nonlinear dynamics model for a fuel tank failure, and a nonlinear dynamics model for a metal fatigue;

the nonlinear dynamics model for the engine failure is:

$$\ddot{\phi} = \frac{\omega_\phi^2}{2\zeta_\phi \omega_\phi}\left(\frac{(M-N)\dot{\theta}\dot{\psi}}{L} + \frac{K_u}{L} - \frac{K_1\phi}{L}\right)$$

$$\ddot{\theta} = \frac{(N-L)\dot{\phi}\dot{\psi}}{M} + \frac{K_u(u_1 - u_2)}{M} - \frac{K_2\dot{\theta}}{M}$$

$$\ddot{\psi} = \frac{(L-M)\dot{\phi}\dot{\theta}}{N} + \frac{(u_1 + u_2)}{N} - \frac{K_3\dot{\psi}}{N}$$

wherein $\phi$ represents a roll angle, $\theta$ represents a pitch angle, $\psi$ represents a yaw angle, L, M, and N represent moments of inertia around three axial directions of a coordinate system of an aircraft body, $\omega_\phi$ and $\zeta_\phi$ represent a frequency and a damping, respectively, $K_u$ represents an aerodynamic gain, $u_i$ represents a control signal value output to an aircraft engine, i represents a subscript, $K_i$ represents a drag coefficient of the aircraft in a flight process, $\dot{\phi}$, $\dot{\theta}$, and $\dot{\psi}$ represent first-order derivatives of $\phi$, $\theta$, and $\psi$, respectively, and $\ddot{\phi}$, $\ddot{\theta}$, and $\ddot{\psi}$ represent second-order derivatives of $\phi$, $\theta$, and $\psi$, respectively;

after the parachutist performs the parachuting, wherein when the parachutist completes an ejection by an ejection seat thruster, the pitch angle of the aircraft is calculated as follows:

$$\theta_{after} = \theta_{before} - \theta_{change}$$

$$\tan\theta_{change} = \frac{mat}{v_1}$$

$$a = \frac{F_y}{m}$$

$$F_y = -F\sin(\alpha + \beta)\sin b + F\cos(\alpha + \beta)\cos\gamma\cos b$$

wherein $\theta_{before}$ and $\theta_{after}$ respectively represent a pitch angle of the aircraft before the parachutist completes the ejection by the ejection seat thruster and a pitch angle of the aircraft after the parachutist completes the ejection by the ejection seat thruster, $\theta_{change}$ represents a change of the pitch angle of the aircraft after the ejection by the ejection seat thruster, $\alpha$ represents an acceleration in a vertical direction, t represents an ejection time of the ejection seat thruster, m represents a mass of the aircraft, $v_1$ represents a speed of the aircraft in a horizontal direction, $F_y$ represents a component of a thrust F of the ejection seat thruster on a y axis, $\beta$ represents an installation corner of the ejection seat thruster, $\gamma$ represents a roll angle of the ejection seat thruster, $\alpha$ represents an angle of attack of the ejection seat thruster, and b represents an inclination angle of the ejection seat thruster.

5. The method according to claim 1, wherein a length of a convolution kernel of the CNN is consistent with a size of a time step in the LSTM artificial neural network.

6. The method according to claim 1, wherein the SVM regression model takes a hybrid L1/L2 norm function as a loss function and the SVM regression model takes a Laplace function as a kernel function during a training and the SVM regression model selects regularization parameters in the loss function and a kernel width parameter in the Laplace function by a heuristic random search algorithm.

7. The method according to claim 6, wherein the loss function is as follows:

$$\text{LOSS} = cd\|x\|_1 + \|y - \hat{y}\|_1 + \frac{c(1-d)}{2}\|x\|_2^2 + \lambda\|y - \hat{y}\|_2^2$$

wherein LOSS represents the loss function, c and d represent the regularization parameters, x represents an input of the SVM regression model, y and $\hat{y}$ represent the prediction result and a truth-value label of the parachuting time of the parachutist, respectively, and $\lambda$ represents a preset weight parameter.

8. A system for predicting a parachuting time, which is a time at which parachuting is initiated, in case of a sudden failure, comprising:
- a non-transitory computer-readable storage medium comprising at least one program of instructions; and
- at least one hardware processor configured to execute the program of instructions to implement a data obtaining module, a preprocessing module, a failure state determining module, a parachuting data calculation module, an aircraft data calculation module, and a time prediction module, wherein
- the processor, in implementing the data obtaining module, is configured to obtain 3D environment data, sensor data, received tower data, and GIS map data within a current position range about a location of an aircraft when the aircraft flies in a flight course and the processor, in implementing the data obtaining module, is configured to take the 3D environment data, the sensor data, the received tower data, and the GIS map data within the current position range as input data, wherein the 3D environment data comprises weather conditions, air temperature, air pressure, and wind force at different altitudes;
- the processor, in implementing the preprocessing module, is configured to preprocess the input data to obtain preprocessed input data, wherein the preprocessed input data comprises preprocessed 3D environment data, preprocessed sensor data, preprocessed tower data, and preprocessed GIS map data within the current position range;

the processor, in implementing the failure state determining module, is configured to determine, based on the preprocessed sensor data, whether the aircraft is in a sudden failure state, wherein the processor is configured to execute the parachuting data calculation module if the aircraft is in the sudden failure state or execute the data obtaining module if the aircraft is not in the sudden failure state;

the processor, in implementing the parachuting data calculation module, is configured to obtain weight data of a parachutist, and the processor, in implementing the parachuting data calculation module, is configured to generate, based on the preprocessed 3D environment data and the preprocessed GIS map data within the current position range, a trajectory of parachuting and a range of landing points of the parachuting;

the processor, in implementing the aircraft data calculation module, is configured to calculate, based on the preprocessed 3D environment data, the preprocessed sensor data, and the preprocessed GIS map data within the current position range, a trajectory of the aircraft and a range of collision points of the aircraft parachutist performs the parachuting, and an impact force of the aircraft from a collision after the and a damage range of the aircraft from the collision; and the processor, in implementing the time prediction module, is configured to calculate, based on the trajectory of the parachuting and the trajectory of the aircraft after the parachutist performs the parachuting, a minimum horizontal distance between the parachutist and the aircraft at a same time point after the parachuting, maximum horizontal distance between the parachutist and the aircraft at the same time point after the parachuting, minimum vertical distance between the parachutist and the aircraft at the same time point after the parachuting, and maximum vertical distance between the parachutist and the aircraft at the same time point after the parachuting and the time prediction module is configured to obtain a prediction result of the parachuting time of the parachutist by a pre-constructed parachuting time prediction model based on the range of landing points of the parachuting, the range of collision points of the aircraft, the impact force of the aircraft and the damage range of the aircraft from the collision, and the preprocessed tower data, wherein the pre-constructed parachuting time prediction model is constructed based on a convolution neural network (CNN), a long short-term memory (LSTM) artificial neural network, a feature processing module that is implemented by the processor, and a machine learning model;

the CNN and the LSTM artificial neural network are configured to extract a feature of the input data in a specified time period in parallel, wherein the feature extracted by the CNN is taken as a first feature, and the feature extracted by the LSTM artificial neural network is taken as a second feature;

the processor, in implementing the feature processing module, is configured to fuse the first feature and the second feature to obtain a fused feature, the processor, in implementing the feature processing module, is configured to take the fused feature as a third feature, the processor, in implementing the feature processing module, is configured to perform a residual connection and a layer normalization on the third feature and the first feature to obtain a processed feature, and the processor, in implementing the feature processing module, is configured to take the processed feature as a fourth feature; and the machine learning model is configured to obtain the prediction result of the parachuting time of the parachutist after performing a support vector regression operation on the fourth feature, wherein the machine learning model is a support vector machine (SVM) regression model.

9. An electronic device, comprising:
at least one processor and a memory, wherein the memory is communicatively connected to the at least one processor,
wherein an instruction executable by the processor is stored in the memory, and the instruction is configured to be executed by the processor to implement the method according to claim 1.

10. The electronic device according to claim 9, wherein in the method, the step of preprocessing the input data comprises a removal of a data outlier and a data standardization.

11. The electronic device according to claim 9, wherein in the method, the step of calculating the trajectory of the aircraft and the range of collision points of the aircraft after the parachutist performs the parachuting, and the impact force of the aircraft and the damage range of the aircraft from the collision comprises:

obtaining a failure type of the aircraft based on the preprocessed sensor data;

analyzing parameters of the aircraft and flight dynamics characteristics of the aircraft based on the failure type of the aircraft and performing a remodeling to obtain a new nonlinear model in case of the sudden failure of the aircraft;

obtaining, by the new nonlinear model based on the preprocessed 3D environment data and the preprocessed sensor data, the trajectory of the aircraft after the parachutist performs the parachuting, and obtaining the range of collision points based on the preprocessed GIS map data within the current position range; and obtaining a geomorphic condition within the range of collision points based on the preprocessed GIS map data within the current position range and the range of collision points and calculating the impact force of the aircraft and the damage range of the aircraft from the collision.

12. The electronic device according to claim 11, wherein in the method, the new nonlinear model in case of the sudden failure of the aircraft comprises a nonlinear dynamics model for an engine failure, a nonlinear dynamics model for a hydraulic failure, a nonlinear dynamics model for a fuel tank failure, and a nonlinear dynamics model for a metal fatigue; the nonlinear dynamics model for the engine failure is:

$$\ddot{\phi} = \frac{\omega_\phi^2}{2\zeta_\phi \omega_\phi}\left(\frac{(M-N)\dot{\theta}\dot{\psi}}{L} + \frac{K_u}{L} - \frac{K_1\dot{\phi}}{L}\right)$$

$$\ddot{\theta} = \frac{(N-L)\dot{\phi}\dot{\psi}}{M} + \frac{K_u(u_1 - u_2)}{M} - \frac{K_2\dot{\theta}}{M}$$

$$\ddot{\psi} = \frac{(L-M)\dot{\phi}\dot{\theta}}{N} + \frac{(u_1 + u_2)}{N} - \frac{K_3\dot{\psi}}{N}$$

wherein $\phi$ represents a roll angle, $\theta$ represents a pitch angle, $\psi$ represents a yaw angle, L, M, and N represent moments of inertia around three axial directions of a coordinate system of an aircraft body, $\omega_\phi$ and $\xi_\phi$ represent a frequency and a damping, respectively, $K_u$ represents an aerodynamic gain, $u_i$ represents a control signal value output to an aircraft engine, i represents a subscript, $K_i$ represents a drag coefficient of the aircraft in a flight process, $\dot\phi$, $\dot\theta$, and $\dot\psi$ represent first-order derivatives of $\phi$, $\theta$, and $\psi$, respectively, and $\ddot\phi$, $\ddot\theta$, and $\ddot\psi$ represent second-order derivatives of $\phi$, $\theta$, and $\psi$, respectively;

after the parachutist performs the parachuting, wherein when the parachutist completes an ejection by an ejection seat thruster, the pitch angle of the aircraft is calculated as follows:

$$\theta_{after} = \theta_{before} - \theta_{change}$$

$$\tan\theta_{change} = \frac{mat}{v_1}$$

$$a = \frac{F_y}{m}$$

$$F_y = -F\sin(\alpha + \beta)\sin b + F\cos(\alpha + \beta)\cos\gamma\cos b$$

wherein $\theta_{before}$ and $\theta_{after}$ respectively represent a pitch angle of the aircraft before the parachutist completes the ejection by the ejection seat thruster and a pitch angle of the aircraft after the parachutist completes the ejection by the ejection seat thruster, $\theta_{change}$ represents a change of the pitch angle of the aircraft after the ejection by the ejection seat thruster, $a$ represents an acceleration in a vertical direction, t represents an ejection time of the ejection seat thruster, m represents a mass of the aircraft, $v_1$ represents a speed of the aircraft in a horizontal direction, $F_y$ represents a component of a thrust F of the ejection seat thruster on a y axis, $\beta$ represents an installation corner of the ejection seat thruster, $\gamma$ represents a roll angle of the ejection seat thruster, $\alpha$ represents an angle of attack of the ejection seat thruster, and b represents an inclination angle of the ejection seat thruster.

13. The electronic device according to claim 9, wherein in the method, a length of a convolution kernel of the CNN is consistent with a size of a time step in the LSTM artificial neural network.

14. The electronic device according to claim 9, wherein in the method, the SVM regression model takes a hybrid L1/L2 norm function as a loss function and the SVM regression model takes a Laplace function as a kernel function during a training and the SVM regression model selects regularization parameters in the loss function and a kernel width parameter in the Laplace function by a heuristic random search algorithm.

15. The electronic device according to claim 14, wherein in the method, the loss function is as follows:

$$\text{LOSS} = cd\|x\|_1 + \|y - \hat{y}\|_1 + \frac{c(1-d)}{2}\|x\|_2^2 + \lambda\|y - \hat{y}\|_2^2$$

wherein LOSS represents the loss function, c and d represent the regularization parameters, x represents an input of the SVM regression model, y and $\hat{y}$ represent the prediction result and a truth-value label of the parachuting time of the parachutist, respectively, and $\lambda$ represents a preset weight parameter.

16. A non-transitory computer-readable storage medium, wherein a computer instruction is stored in the non-transitory computer-readable storage medium, and the computer instruction is configured to be executed by a computer to implement the method according to claim 1.

17. The non-transitory computer-readable storage medium according to claim 16, wherein in the method, the step of preprocessing the input data comprises a removal of a data outlier and a data standardization.

18. The non-transitory computer-readable storage medium according to claim 16, wherein in the method, the step of calculating the trajectory of the aircraft and the range of collision points of the aircraft after the parachutist performs the parachuting, and the impact force of the aircraft and the damage range of the aircraft from the collision comprises:
  obtaining a failure type of the aircraft based on the preprocessed sensor data;
  analyzing para meters of the aircraft and flight dynamics characteristics of the aircraft based on the failure type of the aircraft and performing a remodeling to obtain a new nonlinear model in case of the sudden failure of the aircraft;
  obtaining, by the new nonlinear model based on the preprocessed 3D environment data and the preprocessed sensor data, the trajectory of the aircraft after the parachutist performs the parachuting, and obtaining the range of collision points based on the preprocessed GIS map data within the current position range; and
  obtaining a geomorphic condition within the range of collision points based on the preprocessed GIS map data within the current position range and the range of collision points and calculating the impact force of the aircraft and the damage range of the aircraft from the collision.

\* \* \* \* \*